United States Patent Office 3,022,324
Patented Feb. 20, 1962

3,022,324
PROCESS FOR THE PREPARATION OF FORMYL STEROIDS AND PRODUCTS OBTAINED THEREBY
Georges Muller, Nogent-sur-Marne, and Milutin Stefanovic, Paris, France, assignors to Les Laboratoires Francais de Chimiotherapie, Paris, France, a corporation of France
No Drawing. Filed Dec. 15, 1959, Ser. No. 859,577
Claims priority, application France July 8, 1959
8 Claims. (Cl. 260—397.4)

The present invention involves the preparation of steroids having an aldehyde function and, more particularly, it relates to a process for preparation of 17-formyl androstanes and 20-formyl pregnanes.

It is known that the formyl steroids are valuable intermediate products for the synthesis of steroids. The presence of the formyl group in the 17-position of compounds of the androstane series makes it possible to transform them into the corresponding 20-hydroxy pregnanes by a Grignard reaction. The 20-formyl pregnanes, which are also made by the process according to the invention, are useful in preparation of substitutions which were heretofore unusual and which modify especially the physiological properties of the pregnane starting materials. In addition, it is possible to prepare by known processes, starting from 20-formyl pregnanes, the corresponding 17α-hydroxy-20-keto-pregnanes (see for example U.S. Patent 2,777,843 to Chemerda, issued January 15, 1957).

Prior to the present invention these formyl steroids have, in general, been obtained by the degradation of the lateral chain of cholestane derivatives or of cholane to obtain the 20-formyl pregnanes, or by total synthesis involving the building up of the D-ring starting from derivatives of phenanthrene to obtain the 17-formyl androstanes.

We have now found, and this is an object of the present invention, that the 17-formyl and 20-formyl steroids can be prepared starting with the corresponding keto steroids. Thus, the present invention provides a simple and easy way of obtaining these products which are important for the synthesis of steroids.

A further object of the invention is the preparation of 17-formyl and 20-formyl derivatives of steroids of the androstane and pregnane series, starting with the corresponding 17-keto and 20-keto compounds and going through the intermediate hydroxy-lower alkoxymethyl derivatives.

A still further object of the invention is the preparation of novel hydroxy-lower alkoxymethyl intermediates and 17-formyl and 20-formyl derivatives of the androstane and pregnane series such as (a) The 3-methyl ether of 17α-methoxymethylestradiol;
(b) The 3-methyl ether of 17α-ethoxymethylestradiol;
(c) 17β-formyl-3-methoxy-$\Delta^{1,3,5(10)}$-androstatriene;
(d) The semicarbazone of 17β - formyl - 3 - methoxy-$\Delta^{1,3,5(10)}$-androstatriene;
(e) 3β - acetoxy - 17β - hydroxy - 17α - methoxymethyl-$\Delta^5$-androstene;
(f) 3α - acetoxy - 20ξ - methoxymethyl - 20 - hydroxy-pregnane-11-one.

These and other objects of the invention will become more apparent as the description proceeds.

The process which is the object of the present invention consists essentially of treating the 17-keto androstanes or 20-keto pregnanes with a lower alkoxymethyl magnesium halide and subjecting the lower alkoxymethyl tertiary steroid alcohols thus obtained to the action of acid dehydrating agents.

The two stages of the process may be summarized for the two series of steroids by the following simplified schematic reaction formulas:

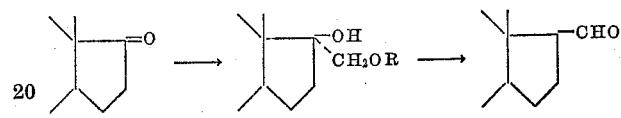

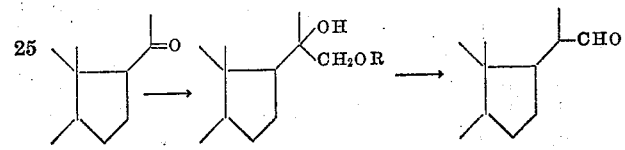

wherein R represents a lower alkyl radical.

An important characteristic of the invention resides in that the reaction of the keto steroids with the organo magnesium compound is carried out in solution in a cycloalkylene ether.

Another important characteristic resides in that this reaction is carried out in the presence of a halide of a metal belonging to the second group of the periodic table of elements.

It is advantageous to use as the lower alkoxymethyl magnesium halide either a bromide or a chloride of methoxymethyl magnesium or a bromide or chloride of ethoxymethyl magnesium.

The preferred cycloalkylene ether for the reaction with the organo magnesium compound is tetrahydrofuran, but 2-methyl tetrahydrofuran or tetrahydropyran are also suitable. Advantageously, the halide of a metal belonging to the second group of the periodic table of elements is mercuric chloride; however, a halide of zinc or cadmium may also be employed.

For the execution of the second stage of the present process of reacting with an acid dehydrating agent, oxalic acid or phosphorous oxychloride are preferably used as the acid dehydrating agents, but other reactants of the same type may be employed without departing from the scope of the invention.

The invention also relates to the steroid compounds obtained by the present process, as well as the intermediates of our preparation, as novel industrial products.

The schematic flow sheet of Table I shows the formulas of the compounds described in the exemplary portion.

TABLE I
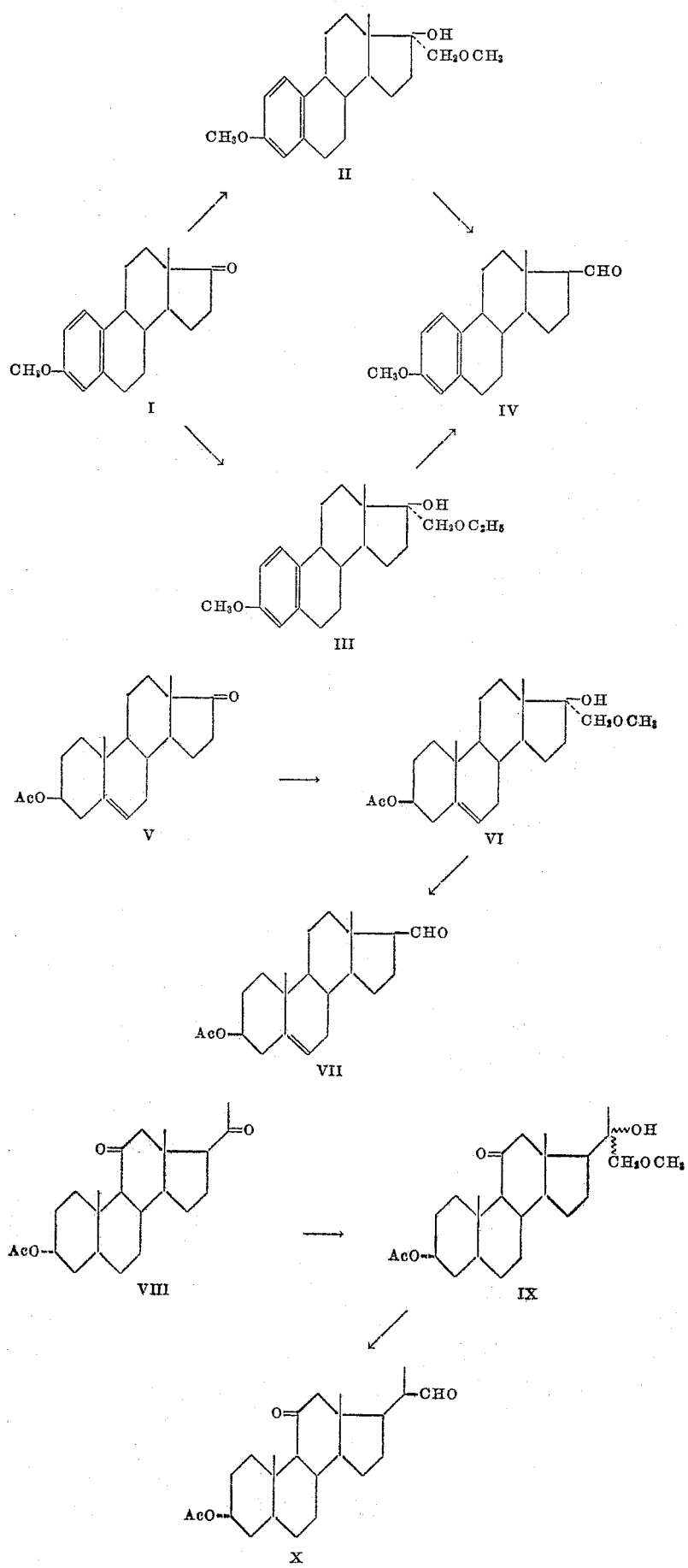

The following non-limiting examples will make the invention better understood.

The melting points are instantaneous melting points determined on a Maquenne block. The temperatures are given in ° C.

EXAMPLE I

*Preparation of 17β-formyl-3-methoxy-$\Delta^{1,3,5(10)}$-androstatriene (IV) by way of the intermediate 3-methyl-ether of 17α-methoxymethyl-estradiol (II)*

(a) 5 gm. of the methyl ether of estrone are introduced into 50 cc. of tetrahydrofuran containing 5 gm. of magnesium turnings and 0.2 gm. of mercuric chloride, the mixture is heated to reflux and then 25 cc. of monochlorodimethyl ether, dissolved in 35 cc. of tetrahydrofuran are added. Refluxing is continued for 1 hour. Thereafter, the reaction mixture is concentrated, poured over ice and acidified by adding concentrated hydrochloric acid. It is then extracted several times with methylene chloride. The extract solutions are combined, washed with water and dried and the solvent is distilled off. The residue is subjected to chromatography over alumina and eluted with methylene chloride. The first two eluted portions yield 5.16 gm. of the product which is again subjected to chromatography over alumina and eluted with benzene to obtain 2.56 gm. of the 3-methyl ether of 17α-methoxymethyl-estradiol (II). For analysis, the product is recrystallized from ether to obtain a product which melts at 102° C. and has a specific rotation of $[\alpha]_D^{20} = +44°$ (c.=0.5% in chloroform). It is soluble in alcohol, ether, acetone, benzene and chloroform and insoluble in water.

*Analysis.*—$C_{21}H_{30}O_3$; molecular weight 330.45. Calculated: C, 76.32%; H, 9.15%; O, 14.53%. Found: C, 76.3%; H, 9.1%; O, 14.9%.

The infra-red spectrum confirms the indicated structure.

Starting with 4 gm. of compound I, and replacing the chlorodimethyl ether with bromodimethyl ether, 2.07 gm. of compound II are obtained which is identical to the product described above.

The product is not described in the literature.

(b) 560 mgm. of compound II are heated to 110–120° C. with 430 mgm. of oxalic acid containing two molecules of water of hydration. After 1 hour of heating the mixture is cooled and extracted with ether. The extract solutions are washed with sodium bicarbonate and then with water, dried and the solvent is driven off. The residue, which weighs 450 mgm., consists of the aldehyde 17β-formyl-3-methoxy-$\Delta^{1,3,5(10)}$-androstatriene (IV) which is difficult to crystallize. The semicarbazone of compound IV melts at 260° C. with decomposition. The product is very slightly soluble in alcohol and chloroform and insoluble in water and ether.

*Analysis of the semicarbazone.*—$C_{21}H_{29}O_2N_3$; molecular weight: 355.47. Calculated: N, 11.82%. Found: N, 11.4 to 11.6%.

It is not described in the literature. This compound IV is useful as an intermediate in the preparation of 19-nor steroids.

EXAMPLE II

*Preparation of compound IV by way of the intermediate 3-methyl ether of 17α-ethoxymethyl-estradiol (III)*

5.14 gm. of the methyl ether of estrone are dissolved by refluxing in 130 cc. of tetrahydrofuran containing 5.14 gm. of magnesium. Thereafter, 100 mgm. of mercuric chloride are added and then 25 cc. of chloromethylethyl ether dissolved in 30 cc. of tetrahydrofuran. The reaction is rather vigorous; the solvent is allowed to distill off freely, which entrains the excess of reactant which is then reintroduced dropwise into the reaction medium. At the end of 45 minutes a crystalline precipitate begins to form; the distillation is continued under the same conditions for an additional hour. The reaction mixture is then poured over ice, acidified to a pH of 1 by the addition of hydrochloric acid, and extracted several times with methylene chloride. After washing the extract solutions with water, the solvent is driven off by distillation and a residue weighing 8.5 gm. is obtained, which is subjected to the classic treatment with Girard's reactant T. The non-ketone fraction thus obtained, weighing 8 gm. is dissolved in benzene solution and subjected to chromatography over alumina. Eluting with petroleum ether yields a solidified resin consisting of the 3-methyl ether of 17α-ethoxymethyl-estradiol (III) which melts at about 45° C. The product is very soluble in alcohol, ether, acetone, benzene and chloroform, and insoluble in water.

*Analysis.*—$C_{22}H_{32}O_3$; molecular weight: 344.48. Calculated: C, 76.70%; H, 9.36%. Found: C, 76.5%; H, 9.3%.

The infra-red spectrum confirms the given structure. Product III is not described in the literature.

Compound III, subjected to the treatment described in Example I(b) yields the aldehyde 17β-formyl-3-methoxy-$\Delta^{1,3,5(10)}$-androstatriene.

EXAMPLE III

*Preparation of 17β-formyl-3β-acetoxy-$\Delta^5$-androstene (VII)*

(a) 5 gm. of bromodimethyl ether in 20 cc. of anhydrous tetrahydrofuran are added slowly to a mixture consisting of 5 gm. of 3β-acetoxy-$\Delta^5$-androstene-17-one (V), 2 gm. of magnesium turnings and 0.5 gm. of mercuric chloride in 50 cc. of anhydrous tetrahydrofuran. The reaction mixture is maintained under reflux for 1½ hours, then cooled. The magnesium compound formed by the reaction is decomposed with a 10% aqueous solution of sulfuric acid and extracted with methylene chloride. The extract solutions are washed with a solution of sodium bicarbonate and with water, dried and the solvent is distilled off. The residue is crystallized from ethanol and then from isopropyl ether. 3β-acetoxy-17β-hydroxy-17α-methoxymethyl-$\Delta^5$-androstene (VI) having a melting point of 182° C. and a specific rotation of $[\alpha]_D^{20} = -82°$ (c.=0.5% in chloroform) is obtained.

In addition, the ethanolic mother liquor from the crystallization step is subjected to chromatography over alumina and after elution with a mixture of benzene and ether (2:1), an additional quantity of the same product having a melting point of 182° C. is obtained. For analysis, the product is crystallized from isopropyl ether, whereupon a sample melting at 188° C. and having a specific rotation of $[\alpha]_D^{20} = -95°$ (c.=0.5% in chloroform) is obtained. This compound is soluble in alcohol, ether, acetone, benzene and chloroform, and insoluble in water and dilute aqueous acids and alkalies.

*Analysis.*—$C_{23}H_{36}O_4$; molecular weight: 376.52. Calculated: C, 73.36%; H, 9.64%. Found: C, 73.5%; H, 9.6%.

(b) 300 mgm. of compound VI is subjected to a treatment analogous to that described in Example I(b), whereby the corresponding aldehyde, that is 17β-formyl-3β-acetoxy-$\Delta^5$-androstene (VII) is obtained. The semicarbazone of compound VII melts at about 180° C.

EXAMPLE IV

*Preparation of 3α-acetoxy-20-formyl-pregnane-11-one (X)*

(a) 625 mgm. of magnesium turnings and 50 mgm. of mercuric chloride are admixed with 12 cc. of anhydrous tetrahydrofuran, and then 2.5 cc. of bromodimethyl ether in 12 cc. of tetrahydrofuran are introduced into this mixture very slowly, while cooling. The mixture is agitated for ½ hour, and then 5 gm. of 3α-acetoxy-pregnane-11,20-dione in 30 cc. of tetrahydrofuran are added. Agitation is continued for an additional ½ hour. Thereafter, the reaction mixture is poured into a solution of 10 cc. of 2 N sulfuric acid in 200 cc. of iced water and the mixture is extracted with ether. The organic phase is separated and washed with a saturated solution of sodium bicarbonate and then with water. After drying, the solvent is driven off by distillation, the residue is dissolved in 20 cc. of pyridine, 10 cc. of acetic acid anhydride are added and the mixture is allowed to stand at room temperature for 2 hours. The anhydride is hydrolyzed and the mixture is extracted with ether. The extract solutions are combined and successively washed with dilute hydrochloric acid, water, sodium bicarbonate and water, then dried and the solvent is driven off in vacuo. The residue is crystallized from petroleum ether. 3α-acetoxy-20ξ-methoxymethyl-20-hydroxy pregnane-11-one (IX) having a melting point of 147° C. and a specific rotation of $[\alpha]_D^{20} = -61°$ (c.=0.5% in chloroform) is obtained. An additional quantity of this product can be recovered from the mother liquor. Compound IX is obtained in the form of colorless crystals which are soluble in alcohol, ether, acetone, benzene, chloroform and isopropyl ether and insoluble in water.

It is not described in the literature.

(b) 1 gm. of compound IX, melting point of 147° C., is dissolved in 20 cc. of phosphorus oxychloride. The solution is agitated for 3 hours at ambient temperature, whereby a yellow solution is obtained, which is poured over ice. The suspension thus obtained is vacuum filtered. The filter cake is washed with water and dissolved in methylene chloride. This solution is washed with sodium bicarbonate and water, dried and the solvent is driven off in vacuo. The residue is crystallized from ether, whereby 220 mgm. of a 20-isomer of 3α-acetoxy-20-formyl-pregnane-11-one (X) having a melting point of 190° C. and a specific rotation of $[\alpha]_D^{20} = +64°$ (c.=0.5% in chloroform) are obtained.

Analysis.—$C_{24}H_{36}O_4$; molecular weight: 388.5. Calculated: C, 74.19%; H, 9.34%. Found: C, 73.9%; H, 9.6%.

The other 20-isomer is isolated from the filtrate. This isomer has a melting point of 160° C. and a specific rotation of $[\alpha]_D^{20} = +75°$ (c.=0.5% in chloroform).

The two isomers are soluble in alcohol, acetone, benzene, chloroform and hot ether, and insoluble in water and dilute aqueous acetone and alkalies.

It is to be understood that the invention is not limited to the specific embodiments described above. More particularly, the reaction conditions, the reaction temperatures and other conditions may be varied without departing from the spirit of the invention or the scope of the appended claims.

We claim:
1. A process for the preparation of formylated steroids selected from the group consisting of 17-formyl androstanes and 20-formyl pregnanes which comprise the steps of reacting a keto steroid selected from the group consisting of 17-keto-androstanes and 20-keto-pregnanes with a lower alkoxymethyl magnesium halide in the presence of cycloalkylene ether selected from the group consisting of tetrahydrofuran, 2-methyl tetrahydrofuran, and tetrahydropyran, recovering a lower alkoxymethyl-hydroxy steroid, subjecting said lower alkoxymethyl-hydroxy-steroid to the action of an acid dehydrating agent selected from the group consisting of oxalic acid and phosphorus oxychloride and recovering said formylated steroids.

2. The process of claim 1 wherein the reaction between said keto steroids and said lower alkoxymethyl magnesium halide is carried out in the presence of a halide of a metal selected from a group consisting of mercury, zinc and cadmium.

3. A process for the preparation of formylated steroids selected from the group consisting of 17-formyl androstanes and 20-formyl pregnanes which comprise the steps of reacting a keto steroid selected from the group consisting of 17-keto-androstanes and 20-keto-pregnanes with a compound selected from the group consisting of methoxymethyl magnesium chloride, methoxymethyl magnesium bromide, ethoxymethyl magnesium chloride and ethoxymethyl magnesium bromide in the presence of a solvent selected from the group consisting of tetrahydrofuran, 2-methyl tetrahydrofuran and tetrahydropyran, and mercuric chloride, recovering a hydroxy steroid selected from the group consisting of 17-hydroxy-17-methoxymethyl androstanes, 17-hydroxy-17 - ethoxymethyl-androstanes, 20-hydroxy-20-ethoxymethyl-pregnanes and 20-hydroxy-20-methoxymethyl-pregnanes, subjecting said hydroxy steroid to the action of an acid dehydrating agent selected from the group consisting of oxalic acid and phosphorus oxychloride and recovering said formylated steroids.

4. The 3-methyl ether of 17α-methoxymethyl estradiol.

5. The 3-methyl ether of 17α-ethoxymethyl estradiol.

6. 3β - acetoxy - 17β-hydroxy-17α - methoxymethyl-$\Delta^5$-androstene.

7. 17β-formyl-3-methoxy-$\Delta^{1,3,5(10)}$-androstatriene.

8. The semicarbazone of 17β-formyl-3-methoxy-$\Delta^{1,3,5(10)}$-androstatriene.

No references cited.